F. Chase.

Shutter Worker.

Nº 34,739.  Patented Mar. 25, 1862.

Witnesses:  Inventor:

UNITED STATES PATENT OFFICE.

FRANK CHASE, OF SOUTH SUTTON, NEW HAMPSHIRE.

IMPROVEMENT IN BLIND AND SHUTTER FASTENINGS.

Specification forming part of Letters Patent No. 34,739, dated March 25, 1862.

*To all whom it may concern:*

Be it known that I, FRANK CHASE, of South Sutton, in the county of Merrimac and State of New Hampshire, have invented a new and Improved Blind and Shutter Fastening; and I do hereby declare that the following is a full, clear, and exact description of the same, reference being had to the accompanying drawings, making a part of this specification, in which—

Figure 1:
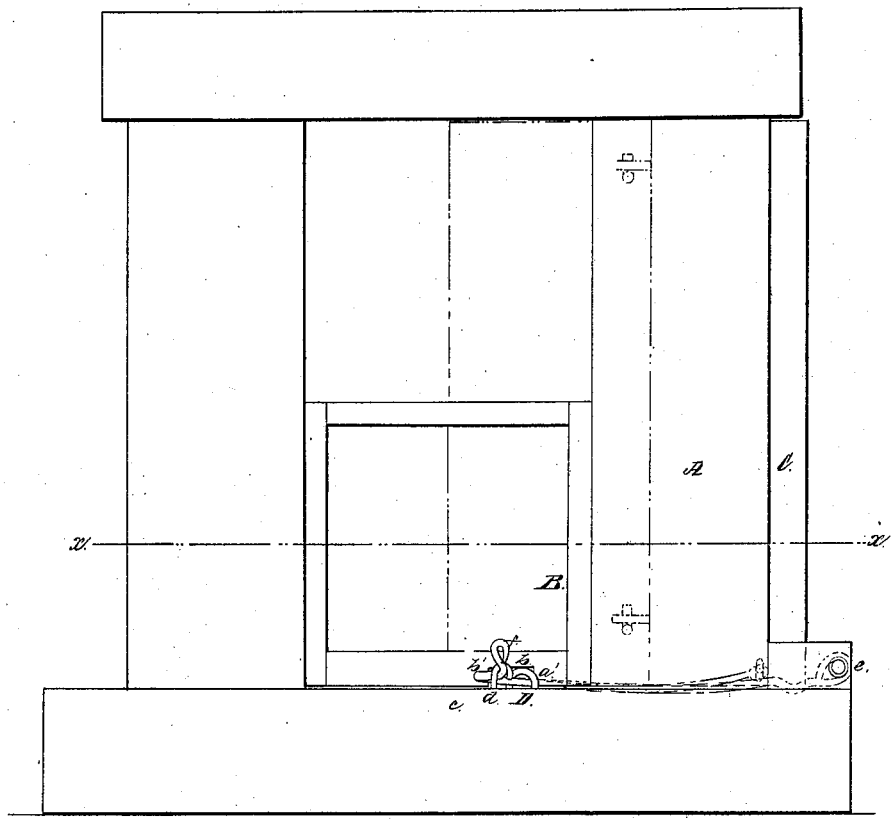
Figure 2:
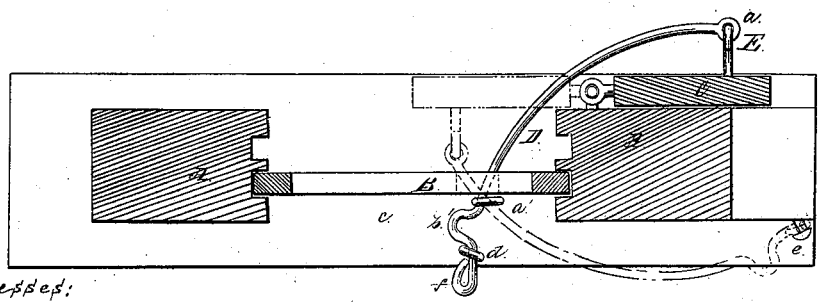

Figure 1 is an inner face view of a window with my invention applied to it; Fig. 2, a horizontal section of the same, taken in the line X X, Fig. 1.

Similar letters of reference indicate corresponding parts in the two figures.

The object of this invention is to obtain a blind and shutter fastening which will admit of the blind or shutter being opened and closed at the inner side of the window without raising the sash, and one which will not admit of the blind or shutter being opened at the outer side of the window, nor allow the blind or shutter to be acted upon by the wind, so as to rattle, and not liable to become casually unfastened nor get out of repair.

The invention consists in attaching a curved rod or bar to the lower part of the blind or shutter, said rod or bar being somewhat elastic and passing through an opening or notch in the lower edge of the lower sash, said rod or bar having a projection or bend near its end, which, in connection with a hook and pin, serves as a fastening, as hereinafter fully shown and described.

To enable those skilled in the art to fully understand and construct my invention, I will proceed to describe it.

A represents a window-frame, which may be constructed in the usual way.

B represents the lower sash, which is arranged to rise and fall as usual, and C is a shutter hung to the outer side of the window-frame in the ordinary way.

To the lower part of the shutter C there is attached a curved rod or bar D, which is sufficiently light to have some degree of elasticity. The outer end of this rod or bar D is attached to the shutter C by an eye E, which is driven into the shutter, the end of the rod or bar D passing through the eye and being bent to form a hook or eye $a$. This mode of connection forms a sort of universal joint, as clearly shown in Fig. 2. The rod or bar D passes through a recess or notch $b$ in the lower edge of the lower sash B and through a staple or guide $a$ in the sill $c$, and the rod or bar D near its inner end has a quick bend or curve $b$ made in it to form a lateral projection with a rounded or semicircular end, as shown in Fig. 2.

In the sill $c$ of the window-frame A, near its inner edge, there is driven a hook $d$, and in the inner side of the window-frame, at its lower right-hand corner, there is driven a pin $e$, the use of which will be presently shown.

When the shutter C is in a closed state, the inner end of the rod or bar D, which terminates in an eye $f$, is fitted on the pin $e$, as shown in red in Figs. 1 and 2, and the shutter is thereby fastened. In order to open the shutter C, the eye $f$ is removed from the pin $e$ and the rod or bar D shoved outward, and the shutter thereby opened. As the shutter approaches an open state the projection $b$ passes in front of the hook $d$ and serves to prevent the shutter from casually closing, and as the rod or bar D is attached by a joint to the shutter C the former will sink or drop a little by its own weight and cause the inner part of the rod or bar to pass up under or within the hook $a$, as shown clearly in Fig. 1, which serves to prevent the projection $b$ from slipping out of proper position. The elasticity of the rod or bar D prevents the shutter from rattling under the action of the wind, for it is designed to leave the rod or bar taut, or at a proper degree of tension, so that its own spring or elasticity will act against the shutter sufficiently strong when the latter is both in an opened and closed state to keep the shutter firmly in position. The curvature of the rod or bar, it will be understood, gives it its spring or elasticity.

The invention, it will be seen, is extremely simple. It is self-fastening, prevents the blind or shutter being opened at the outer side of the window, and admits of the blind or shutter being opened and closed at the inner side without raising the sash.

Having thus described my invention, what I claim as new, and desire to secure by Letters Patent, is—

The curved rod or bar D, applied to the blind or shutter C, as shown, provided with the lateral projection $b$ and eye $f$, and used in connection with the hook $a$ and pin $e$, attached to the window-frame A, substantially as and for the purpose set forth.

<div style="text-align: right;">FRANK CHASE.</div>

Witnesses:
   JEROME G. ROGERS,
   MEHITABLE S. NELSON.